US010416303B2

(12) United States Patent
Hellsten

(10) Patent No.: US 10,416,303 B2
(45) Date of Patent: Sep. 17, 2019

(54) SUBSURFACE IMAGING RADAR

(71) Applicant: SAAB AB, Linkoeping (SE)

(72) Inventor: Hans Hellsten, Linkoeping (SE)

(73) Assignee: SAAB AB, Linkoeping (SE)

( * ) Notice: Subject to any disclaimer, the term of this patent is extended or adjusted under 35 U.S.C. 154(b) by 325 days.

(21) Appl. No.: 15/344,774

(22) Filed: Nov. 7, 2016

(65) Prior Publication Data
US 2017/0299716 A1 Oct. 19, 2017

Related U.S. Application Data

(63) Continuation of application No. 14/649,836, filed as application No. PCT/SE2012/051414 on Dec. 17, 2012, now Pat. No. 9,519,055.

(51) Int. Cl.
G01S 13/02 (2006.01)
G01S 13/90 (2006.01)
G01S 7/292 (2006.01)
G01S 7/02 (2006.01)
G01S 13/88 (2006.01)

(52) U.S. Cl.
CPC .......... *G01S 13/9035* (2013.01); *G01S 7/025* (2013.01); *G01S 7/292* (2013.01); *G01S 13/02* (2013.01); *G01S 13/885* (2013.01); *G01S 13/90* (2013.01); *G01S 2013/9076* (2013.01)

(58) Field of Classification Search
CPC ........ G01S 13/02; G01S 13/885; G01S 13/90; G01S 13/9035; G01S 2013/9076; G01S 7/025; G01S 7/292
USPC ...................................................... 342/25 R
See application file for complete search history.

(56) References Cited

U.S. PATENT DOCUMENTS

| 3,772,689 A | 11/1973 | Root, Jr. |
| 3,918,055 A | 11/1975 | Shimizu et al. |
| 4,323,898 A | 4/1982 | Barnes et al. |
| 4,766,435 A | 8/1988 | Wells |

(Continued)

FOREIGN PATENT DOCUMENTS

| EP | 1965223 A1 | 9/2008 |
| EP | 2932296 A1 | 10/2015 |
| GB | 2479872 A | 11/2011 |

OTHER PUBLICATIONS

European Patent Office, Supplementary European Search Report for Application No. 12890554, dated Jun. 7, 2016, 7 pages, Germany.

(Continued)

*Primary Examiner* — Timothy A Brainard
(74) *Attorney, Agent, or Firm* — Alston & Bird LLP

(57) ABSTRACT

A method and system for obtaining SAR images with reduced or eliminated surface clutter to detect subsurface targets, the method comprising the following steps:—selecting a first frequency and an incidence angle for the radar signal such that the ratio of surface backscattering to subsurface target backscattering is significantly larger for vertical polarization than for horizontal—obtaining vertically and horizontally polarized SAR images based on the same SAR path exploiting the selected first frequency and viewing angle—weighting and differencing the vertically and horizontally polarized SAR images so that the surface backscattering completely cancels between the two images and only the combination of the target backscattering components remains.

16 Claims, 9 Drawing Sheets

(56) References Cited

U.S. PATENT DOCUMENTS

| | | |
|---|---|---|
| 5,952,954 A | 9/1999 | Beckner |
| 2004/0118313 A1 | 6/2004 | Temes et al. |
| 2005/0128125 A1 | 6/2005 | Li et al. |
| 2007/0024489 A1 | 2/2007 | Cerwin |
| 2009/0102704 A1* | 4/2009 | Fujimura ................ G01S 7/025 342/25 A |
| 2010/0052970 A1 | 3/2010 | Moussally et al. |
| 2011/0169682 A1 | 7/2011 | Chen |
| 2015/0331097 A1 | 11/2015 | Hellsten |

OTHER PUBLICATIONS

International Preliminary Examining Authority, International Preliminary Report on Patentability for International Application No. PCT/SE2012/051414, dated Dec. 1, 2014, 5 pages, Swedish Patent and Registration Office, Stockholm.
International Searching Authority (ISA), International Search Report and Written Opinion for International Application No. PCT/SE2012/051414, dated Oct. 10, 2013, 10 pages, Swedish Patent and Registration Office, Stockholm.
SAAB AB, Applicant's Response to ISA's dated Oct. 10, 2013 Written Opinion for International Application No. PCT/SE2012/051414, dated Oct. 15, 2014, 5 pages, Zacco Sweden AB.
United States Patent and Trademark Office, Notice of Allowance for U.S. Appl. No. 14/649,836, dated Aug. 15, 2016, 9 pages, U.S.A.
United States Patent and Trademark Office, Office Action for U.S. Appl. No. 14/649,836, dated Feb. 2, 2016, 10 pages, U.S.A.
United States Patent and Trademark Office, Office Action for U.S. Appl. No. 14/649,836, dated May 25, 2016, 9 pages, U.S.A.

* cited by examiner $$\sigma_H = |F_H(x,y)|^2$$

$$\sigma_V = |F_V(x,y)|^2$$

$$\sigma_{H,g} = |c_{H,g} f_g(x,y)|^2$$

$$\sigma_{H,t} = |c_{H,t} f_t(x,y)|^2$$

$$F_H(x,y) = c_{H,g} f_g(x,y) + c_{H,t} f_t(x,y)$$

$$F_V(x,y) = c_{V,g} f_g(x,y) + c_{V,t} f_t(x,y)$$

$$\sigma_{V,t} = |c_{V,t} f_g(x,y)|^2$$

$$\sigma_{V,g} = |c_{V,g} f_g(x,y)|^2$$

Fig. 5

SUBSURFACE IMAGING RADAR

CROSS-REFERENCE TO RELATED APPLICATIONS

This application is a continuation application of and claims priority to and the benefit of U.S. application Ser. No. 14/649,836, filed Jun. 4, 2015, which application is further a national stage application, filed under 35 U.S.C. § 371, of International Application No. PCT/SE2012/051414, filed Dec. 17, 2012; the contents of both of which as are hereby incorporated by reference in their entirety.

BACKGROUND

Related Field

The invention relates to a subsurface imaging radar device comprising a transmitting unit and a receiving unit, the transmitting unit being arranged to transmit a first radio wave signal in a lobe towards a selected ground area at a selected elevation angle θ to the ground area. The invention also refers to a method for such a subsurface imaging radar device.

Description of Related Art

In the arid and open areas of many current conflicts burying objects is a commonplace element of military tactics. The rationale is that this is often the single way of concealing them, and very simple to do in e.g. sandy terrain. These objects can be mines, concealed weapons or tunnels and bunkers. Correspondingly there is a strong requirement for efficient means of detecting these types of buried objects.

The circumstances and purposes for buried object detection vary. Still surveillance capacity linked to a high probability of detection is a general concern. For instance a military transport en route along a road must possess a possibility to detect the mines which may harm it when traveling at some reasonable speed. In contrast after a peace treaty there is very strong requirement for efficient demining requiring all mines to be found and deactivated. They may be spread over large areas, and not always in a fashion which is well controlled. In this case there is no real time demand though the surveillance task is often so large that surveillance capacity must be large. Searching for concealed weapons, is often delimited to certain areas and may not have any immediate real time requirement. However there may be a strong pressure to obtain results within definite deadlines so surveillance capacity is a concern in this case too.

An emerging application area is the restoration of former military storage and training areas to civilian land use. The areas can be severely polluted by unexploded ordnance, and harmful waste. The location of waste deposits may have been forgotten through the dramatic organizational changes in e.g. Eastern Europe.

When surveillance requirements are large the use of handheld mine detection devices would be inefficient. Also self-moving detection devices depending on magnetostatic or electrostatic effects (thus measuring the ground permeability or dielectricity constant) have low surveillance capacity. The reason is that static fields decline at short ranges, calling for careful and slow movements in the detection process. In contrast, radar is based on electromagnetic radiation. Since range attenuation of electromagnetic radiation is smaller than that of electrostatic fields, radar seems to be the principle to be preferred for large coverage subsurface object detection.

Subsurface objects may be small, and their signatures very weak. Therefore a detection device must sense only a small portion of the ground where the disturbance of the ground due to the presence of an object will be relatively noticeable. A problem with radar operating at larger surveillance ranges is therefore how to obtain sufficient resolution, isolating small volumes of the ground. The principle of synthetic aperture radar, SAR, is a well-known method to obtain high 2-dimensional resolution of the ground surface.

A Synthetic Aperture Radar, SAR, is preferably used from air though ground based systems are also feasible. An airborne SAR produces two-dimensional images perpendicular to the aircraft path of flight. One dimension in the image is called range (or cross track) and is a measure of the "line-of-sight" distance from the radar to the target. Range measurement and resolution are achieved in synthetic aperture radar in the same manner as most other radars: Range is determined by precisely measuring the time from transmission of a pulse to receiving the echo from a target and, in the simplest SAR, range resolution is determined by the transmitted signal bandwidth, i.e. large bandwidth signals yield fine range resolution.

The other dimension is called azimuth (or along track) and is perpendicular to range over the ground surface. It is the ability of SAR to produce fine azimuth resolution that differentiates it from other radars. To obtain fine azimuth resolution, a physically large antenna is needed to focus the transmitted and received energy into a sharp beam. The sharpness of the beam defines the azimuth resolution. Similarly, optical systems, such as telescopes, require large apertures (mirrors or lenses which are analogous to the radar antenna) to obtain fine imaging resolution. Since SARs are much lower in frequency than optical systems, even moderate SAR resolutions require an antenna physically larger than can be practically carried by an airborne platform: antenna lengths several hundred meters long are often required. However, airborne radar could collect data while flying this distance and then process the data as if it came from a physically long antenna. The distance the aircraft flies in synthesizing the antenna is known as the synthetic aperture. A narrow synthetic beamwidth results from the relatively long synthetic aperture, which yields finer resolution than is possible from a smaller physical antenna.

While this section attempts to provide an intuitive understanding, SARs are not as simple as described above. For even moderate azimuth resolutions, a target's range to each location on the synthetic aperture changes along the synthetic aperture. In SAR the energy reflected from the target must be "mathematically focused" to compensate for the range dependence across the aperture prior to image formation. When the aperture is large the SAR can give resolution near the radar wavelength. The focusing is highly sensitive to geometry assumptions and objects will vanish in the SAR image unless these assumptions are made correctly.

However, the previously known radar or SAR systems cannot be, or have limited detection capability, when used for underground detection since the electromagnetic energy cannot penetrate the ground sufficiently, but is reflected over the surface.

EP1965223A1 describes the use of diffraction limited SAR giving large integration angle and a short depth of field which gives that energy from underground targets is focused independently at different depths to enable 3D imaging.

US2007/0024489A1 discloses signal processing methods and systems for ground penetrating radar from elevated platforms to obtain subsurface images. The depression angle, frequency, and polarization can all be adjusted for the soil conditions at hand. In particular, the depression angle is set at the "pseudo-Brewster angle" for improved ground penetration.

BRIEF SUMMARY

The object of the present invention is to provide an improved radar that can be used for improved underground imaging.

The present invention relates to a Synthetic Aperture Radar for detection of targets below ground.

The core of the invention is a linear combination of two SAR images obtained simultaneously. One SAR image being obtained with horizontally polarised radio waves, the other with vertically polarised radio waves. The inventor has realised that both polarizations respond with very different intensity to surface detail, whereas their underground responses occur with more similar intensities. The linear combination is adjusted in a particular manner such that a difference between the two differently obtained images practically cancels out surface clutter, but subsurface signals will not cancel each other out. The precise method and algorithm(s) for linear combination uses an adaptive "minimum energy" polarimetric difference SAR image, removing the surface influence.

Detection Method(s)

The present invention provides a method of detection underground objects based on an inventive polarization change detection algorithm (PCD algorithm) that applies to low frequency synthetic aperture radar (SAR) at frequencies below 500 MHz. The wavelength at these frequencies is greater or equal to 0.6 m.

The radar backscattering occurring for bare ground at these wavelengths can be related to the Fourier components of the ground elevation profile, by the theory of Bragg scattering. For most types of bare ground and the wavelengths considered, the elevation amplitudes of the individual Fourier components are only a fraction of the wavelength. For this reason also the polarization effects become well-modeled by the so-called "small perturbation model" (SPM), soundly established in the theory of electromagnetic rough surface scattering. In the case of bare ground PCD may be designed to deterministically rely on this SPM model or alternatively be designed as an adaptive algorithm, statistically matching the data to the model. The latter approach has the advantage of also incorporating deviations from the SPM. For instance, the method may allow for the ground surface to be lightly vegetated, but only when using the approach wherein data is statistically matched by an adaptive algorithm. The SPM model is then no longer valid, and the situation difficult to model theoretically, but it would still remain at least approximately true that backscattering amplitudes would stand in a fixed ratio between vertical and horizontal polarization when going from pixel to pixel, with the vertical amplitudes significantly stronger.

The PCD algorithm serves the purpose of eliminating the ground surface backscattering in applications of subsurface target detection. As described, surface backscattering is caused by the roughness of the ground surface. It competes and in many cases overwhelms any response from subsurface objects. In fact, since surface and subsurface responses add with a random phase difference, any underground response may diminish the net ground response just as it may increase it. It follows that thresholding the net response as a means for finding subsurface response is deemed to be inefficient.

Coherent change detection—CCD—is a known process of cancelling surface backscattering taking phase information into account. The cancellation is achieved by subtracting the phase/amplitude information of one SAR image from that of another over the same ground scene. CCD requires that the scene has been overflown twice with target deployments changed in between but that other parameters (e.g. humidity of the ground) has not changed. It cannot be an overly efficient cancelation method since much of the multiplicative noise structure (speckle and side lobes—these effects can be significant) will be independent between the overflights and will not cancel.

The PCD algorithm of the present invention relies on simultaneous or intertwined horizontally and vertically polarized measurements during the same flight. It thus does not have the efficiency limitations of CCD. On the other hand it implies a net reduction of target response with 6-10 dB, which although a drawback can be compensated (according to the radar equation) by shortening of surveillance ranges by 40% to 50%.

Thus, according to a first aspect there is provided a method of removing surface clutter in SAR radar imaging of subsurface targets, the method comprising the following steps:

selecting a first frequency and an incidence angle ($\chi_o$) for a radar signal such that the ratio of surface backscattering to subsurface target backscattering is significantly larger for vertical polarization than for horizontal;

obtaining vertically and horizontally polarized SAR images based on the same SAR path exploiting the selected first frequency and incidence angle for a vertically polarized and a horizontally polarized radar signal;

weighting and differencing the vertically and horizontally polarized SAR images so that the surface backscattering completely cancels between the two images and only the combination of the target backscattering components remains.

The method, wherein the first frequency of the radar signal and the incidence angle are chosen such that the wavelength of the vertically polarized radar signal is greater or equal than the surface roughness.

The method, wherein the incidence angle is chosen to be as low as possible but without shadows arising.

The method wherein the incidence angle is chosen to be larger than zero (horizontal incidence) and less than the Brewster angle.

The method, wherein the horizontal and vertically polarized radar signals are generated by a horizontal and a vertical antenna that conduct registrations in a so called ping-pong mode.

The method, wherein the first frequency is in the interval of 25-500 MHz.

The method, wherein the first frequency is in the interval of 130-360 MHz.

The method, wherein the transmitting and receiving components have been adapted to work within a range of 25 m to 5000 m.

The method, wherein the transmitting and receiving components have been adapted to work within a range of 100 m to 500 m The method, wherein an adaptive minimum energy method is used to weighting and differencing the vertically and horizontally polarized SAR images so that the surface backscattering nearly or completely cancels between the two images and only the combination of the target backscattering components remains.

The method, wherein the method comprises the following steps:
- with the aid of an aircraft in flight (205);
- obtain (210) a HH complex SAR image $F_H(x,y)$;
- obtain (215) a VV complex SAR image $F_V(x,y)$;
- select (305, 350), within the images, an area T that appear to be homogenous;
- find (310) a γmin such that $$E = \int\int_T |F_H(x, y) - \gamma_{min} F_V(x, y)|^2 dxdy = \min$$

form (320) a ground clutter suppressed SAR image ΔF(x, y) by forming the expression $$\Delta F(x,y) = F_H(x,y) - \gamma_{min} F_V(x,y)$$

The method, wherein subsurface targets subsequently is detected by applying e.g. CFAR thresholding, ICD or CCD methods on ΔF.

According to a second aspect there is provided a SAR system for providing SAR images having removed surface clutter to improve detection of subsurface targets, the system comprising
- a first transmitter;
- a first antenna;
- a first duplexer;
- a first receiver;
for obtaining a horizontally polarized SAR image, and
- a second transmitter;
- a second antenna;
- a second duplexer;
- a second receiver;
for obtaining a vertically polarized radar image, the system further comprises
- an incidence angle unit for providing incidence angle data to an
- analytical coefficient calculator, which is configured to calculate coefficients $C_{H,g}, C_{V,g}, C_{H,t}, C_{V,t}$ to be used in the calculations of
- a linear combiner, the system further comprises
- a linear combiner control unit for controlling the linear combiner to linearly combine the images from the first receiver and the second receiver to form a ground clutter suppressed SAR image (ΔF(x, y)) by forming the difference between the horizontal polarization SAR image and the product of γmin or $C_{H,g}/C_{V,g}$ and the vertical polarization SAR image, as selected by an operator and conveyed by the linear combiner control unit, the system further comprises
  - a gamma-min (γmin) finder unit, for finding and providing to the linear combiner a γmin of an energy function, the system also has
  - a selection unit for selecting a homogenous test area T as input to the gamma-min finding unit.

The system, further comprising a target detector and a display unit for detecting and visualizing detected targets to an operator.

The system, further comprising a ping-pong control unit connected to the transmitters to make the transmitters send in ping-pong mode.

According to another aspect, there is provided a method of removing surface clutter in SAR radar imaging of subsurface targets. The method comprises the steps of:
- selecting a first frequency and an incidence angle (χ0) for a radar signal such that the ratio of surface backscattering to subsurface target backscattering is significantly larger for vertical polarization than for horizontal polarization;
- simultaneously obtaining vertically and horizontally polarized SAR images, the obtained SAR images being coincident except for differences in the polarization of each, the obtained SAR images exploiting the selected first frequency and incidence angle for a vertically polarized and a horizontally polarized radar signal; and
- weighting and differencing, via a control unit, the vertically and horizontally polarized SAR images so that the surface backscattering completely cancels between the two images and only the combination of the target backscattering components remains.

According to another aspect, there is provided a SAR system for providing SAR images having removed surface clutter to improve detection of subsurface targets. The system comprises:
- a selection unit configured for selecting a first frequency and an incidence angle (χ0) for a radar signal such that the ratio of surface backscattering to subsurface target backscattering is significantly larger for vertical polarization than for horizontal polarization;
- a linear combiner configured, via a linear combiner control unit, for:
  - simultaneously obtaining vertically and horizontally polarized SAR images, the obtained SAR images being coincident except for differences in the polarization of each, the obtained SAR images exploiting the selected first frequency and incidence angle for a vertically polarized and a horizontally polarized radar signal; and
  - weighting and differencing the vertically and horizontally polarized SAR images so that the surface backscattering completely cancels between the two images and only the combination of the target backscattering components remains.

According to another aspect, there is provided a SAR system for providing SAR images having removed surface clutter to improve detection of subsurface targets. The system comprises:
- a plurality of components collectively configured for simultaneously obtaining a horizontally polarised radar image and a vertically polarized radar image;
- an incidence angle unit for providing incidence angle data;
- an analytical coefficient calculator configured to receive said incidence angle data and to calculate therefrom one or more coefficients;
- a gamma-min (γ min) finder unit (670) configured to determine a γmin of an energy function; and
- a linear combiner control unit for controlling the linear combiner to linearly combine the horizontally polarised radar image and the vertically polarized radar image obtained from the plurality of components to form a ground clutter suppressed SAR image, wherein the horizontally polarised radar image and the vertically polarized radar image are linearly combined by forming (1) the difference between the horizontal polarization radar image and (2) the product of the vertical polarization radar image and one of the calculated coefficients or the γmin.

According to another aspect, there is provided a method of removing surface clutter in SAR radar imaging of subsurface targets. The method comprises the steps of:

simultaneously obtaining, via a plurality of components, a horizontally polarised radar image and a vertically polarized radar image;

receiving, via an incidence angle unit, incidence angle data;

calculating, based upon said incidence angle data, one or more coefficients;

determining a ymin of an energy function; and linearly combining, via a linear combiner controlled via a control unit, the horizontally polarised radar image and the vertically polarized radar image obtained from the plurality of components to form a ground clutter suppressed SAR image, wherein the horizontally polarised radar image and the vertically polarized radar image are linearly combined by forming (1) the difference between the horizontal polarization radar image and (2) the product of the vertical polarization radar image and one of the calculated coefficients or the ymin.

BRIEF DESCRIPTION OF THE FIGURES

The invention and its specific embodiment will now be described in detail with the aid of the following drawings of which

FIG. 5 shows relations to radar cross section or reflectivities at different polarizations and for surface and target scattering elements, measured at any point in intensity SAR images.

DETAILED DESCRIPTION OF VARIOUS EMBODIMENTS

Definitions

Figure 1:
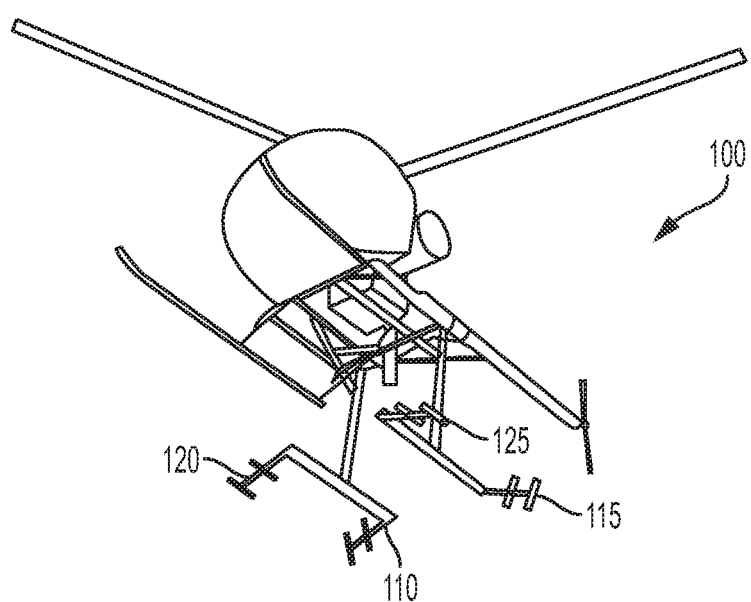
FIG. 1 is a view of a helicopter with a low frequency synthetic aperture radar equipped with antennas of different polarity

The following terms will be used with the associated meanings throughout this document if not otherwise explicitly stated.

Surface roughness; surface roughness is a measure of roughness of a ground surface; there are two well established criteria a surface roughness:

Rayleigh Criterion: if $_\Delta h <_\lambda 8 \cos \theta$, the surface is smooth Fraunhofer Criterion: if $_\Delta h <_\lambda 32 \cos \theta$, then the surface is smooth where $_\Delta h$: standard deviation of surface roughness $_\lambda$: wavelength $\theta$: incident angle Incident angle; incident angle is the angle between longitudinal direction of incident radar signal and the average normal direction to the ground surface;

Ping-pong mode; a radar system having a first and a second combined transmitting and receiving antenna and accompanying transmitters and receivers, can be made to operate in ping-pong mode, i.e., the transmitter of the second antenna does not send until the receiver of the first antenna has received an echo from a signal transmitted by the transmitter of the first antenna, and vice versa.

General

A low frequency SAR radar is arranged to provide a horizontally polarized channel as well as a vertically polarized channel. The channels are arranged to be in line with respect to the direction of flight in order to each provide a SAR image pixel by pixel completely coincident except for the difference in polarization, i.e., if the same polarization had been used, there had been two entirely identical images.

Open land often has a roughness in which average height differences over a distance of one to a few meters is only a fraction of that distance. Radar wavelength of low frequency radar is of the order of one to a few meters. It is known, and a consequence of Maxwell's equations, that when roughness in this manner is small compared to the wavelength of the radar signal, backscattering of the radar signal with vertical polarization, is much stronger than backscattering of a horizontal signal. There is a relationship between backscatter at vertical and horizontal polarization at these particular conditions, which substantially depends on the incident angle, and only weakly depends on the dielectric constant, and do not depend on either the roughness or wavelength. This fact implies that a radar image of the ground surface will be very nearly identical for the horizontal and vertical polarization, with the only but significant difference that the vertically polarized image has much higher intensity.

If there are radar targets below the surface, these will also be found in the two SAR images. Radar strength of underground targets will vary between the channels but not according to the same mathematical laws as the surface reflexes. For underground targets the conditions are guided by Fresnel reflection coefficients, which entails that the vertical polarization provides a greater intensity. The intensity difference is however less for underground targets than for backscattering from the surface.

Because environmental conditions at ground surface and below facilitates it in the above taught manner, backscattering from the ground surface can be eliminated in the SAR image by seeking a linear combination of the differently polarized images. This involves to arrange to assign backscatter from the surface the same amplitude but opposite sign as the backscatter being differently polarized. Backscattering from the underground object will thereby be reduced, but only to a level that can be accepted. Compensation for this reduction is achieved by employing the radar system at a shorter distance, with the crucial advantage that competing surface clutter thereby to a great deal have been eliminated.

Because surface clutter in many cases is the main reason why subsurface targets cannot be distinguished, the method disclosed in the present application should be of great importance in applications intended to identify subsurface targets.

System Overview

The PCD algorithm requires a horizontal polarization transmitted and received (HH) and a vertical polarization transmitted and received (VV) SAR image of the ground which from every aspect of data collection are as similar as possible. Thus:

- Antennas may have a common phase center or a phase centre displaced along the flight axis. In the latter case phase centers should be adjusted to a common phase center with the separation between the two taken into account in SAR processing motion compensation;
- A realization may either be based on a common radar transceiver toggling between the H- and V-polarization antennas or one channel for either and operating in parallel. The latter case has however the drawback of picking up any unwanted cross polarization response.

FIG. 1 shows a helicopter 100 fitted with a low frequency SAR system equipped with H-polarization and V-polarization antennas 110, 115, 120, 125 for intertwined HH and VV SAR images.

Figure 2A:
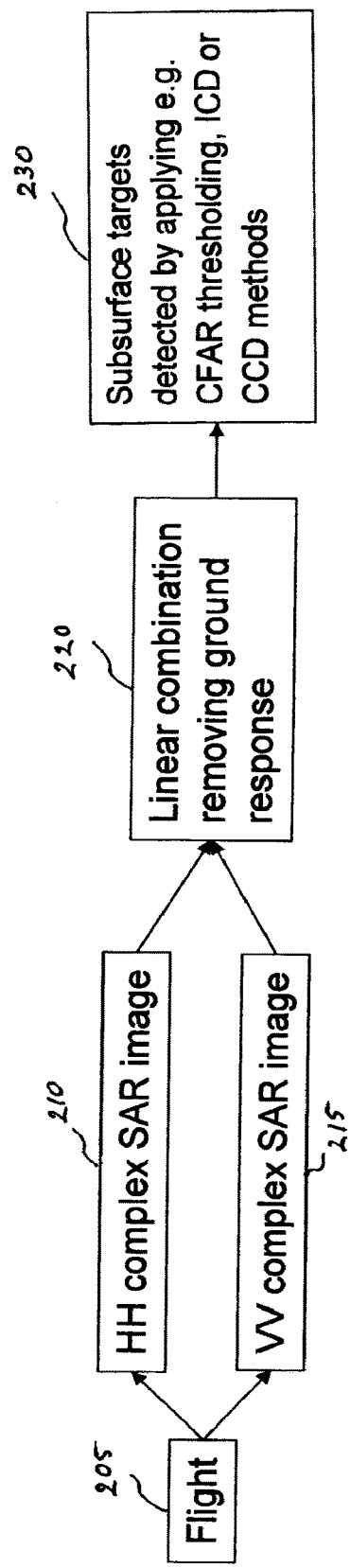
FIG. 2a is a flowchart of a general method of detecting subsurface targets using SAR

FIG. 2a shows a flowchart of a general method of detecting subsurface targets using SAR. During flight 205 horizontal polarization SAR image 20 and vertical polarization SAR image 215 are obtained. The two images are linearly combined 220 by the use of certain method(s) to remove ground response and thereby accentuate underground/subsurface response. Subsequently subsurface targets may be detected manually from display picture or detected 230 with the aid of applying e.g. CFAR thresholding, ICD or CCD methods.

Mathematic Formulas

This section discloses polarimetry formulas for surface and target backscattering modification to semi-transparent surface According to the small perturbation model (SPM) in the theory of electromagnetic rough surface scattering, the complex valued (including phase) HH and VV SAR images has the following structure (below index of refraction n may be assumed real-imaginary part affects very little for relevant soils, incidence angle $\chi_0$)

$$F_H(x,y) = c_{H,g} f_g(x,y) + c_{H,t} f_t(x,y) \quad (I)$$

$$F_V(x,y) = c_{V,g} f_g(x,y) + c_{V,t} f_t(x,y) \quad (II)$$

wherein $F_H(x,y)$ is the horizontal polarization SAR image $F_V(x,y)$ is the vertical polarization SAR image $C_{H,g}$ is a horizontal polarization specific SPM rough surface backscattering coefficient $C_{V,g}$ is a vertical polarization specific SPM rough surface backscattering coefficient $f_g(x,y)$ js SAR image contribution from rough surface $C_{H,t}$ is a horizontal polarization specific 2-way amplitude transmission loss equals Polarization specific 1-way power transmission loss $C_{V,t}$ is a vertical polarization specific 2-way amplitude transmission loss equals Polarization specific 1-way power transmission loss $F_t(x,y)$ is SAR image contribution from subsurface targets Further, polarization specific SPM rough surface backscattering coefficients have the following structure:

$$c_{H,g} = \frac{(n^2 - 1)[\sin^2 \chi_0 - n^2(1 + \sin^2 \chi_0)]}{\left(n^2 \cos \chi_0 + \sqrt{n^2 - \sin^2 \chi_0}\right)^2} a_0$$

$$c_{V,g} = \frac{\cos \chi_0 - \sqrt{n^2 - \sin^2 \chi_0}}{\cos \chi_0 + \sqrt{n^2 - \sin^2 \chi_0}} a_0$$

More, further polarization specific 2-way amplitude transmission loss equals polarization specific 1-way power transmission loss $$c_{H,t} = 1 - \left(\frac{\cos \chi_0 - \sqrt{n^2 - \sin^2 \chi_0}}{\cos \chi_0 + \sqrt{n^2 - \sin^2 \chi_0}}\right)^2$$

$$c_{V,t} = 1 - \left(\frac{\sqrt{n^2 - \sin^2 \chi_0} - n^2 \cos \chi_0}{\sqrt{n^2 - \sin^2 \chi_0} + n^2 \cos \chi_0}\right)^2$$

wherein n is index of refraction (may be assumed real)

$\chi_0$ is incidence angle and expressions squared in the two equations above is Fresnel reflection coefficient.

In this context it could be noted that "dense" equals n=5.5 and "light" equals n=3, which summarizes variability of most dry soils, at frequencies about 100 MHz.

Polarimetric Change Detection Principle

Figure 2B:
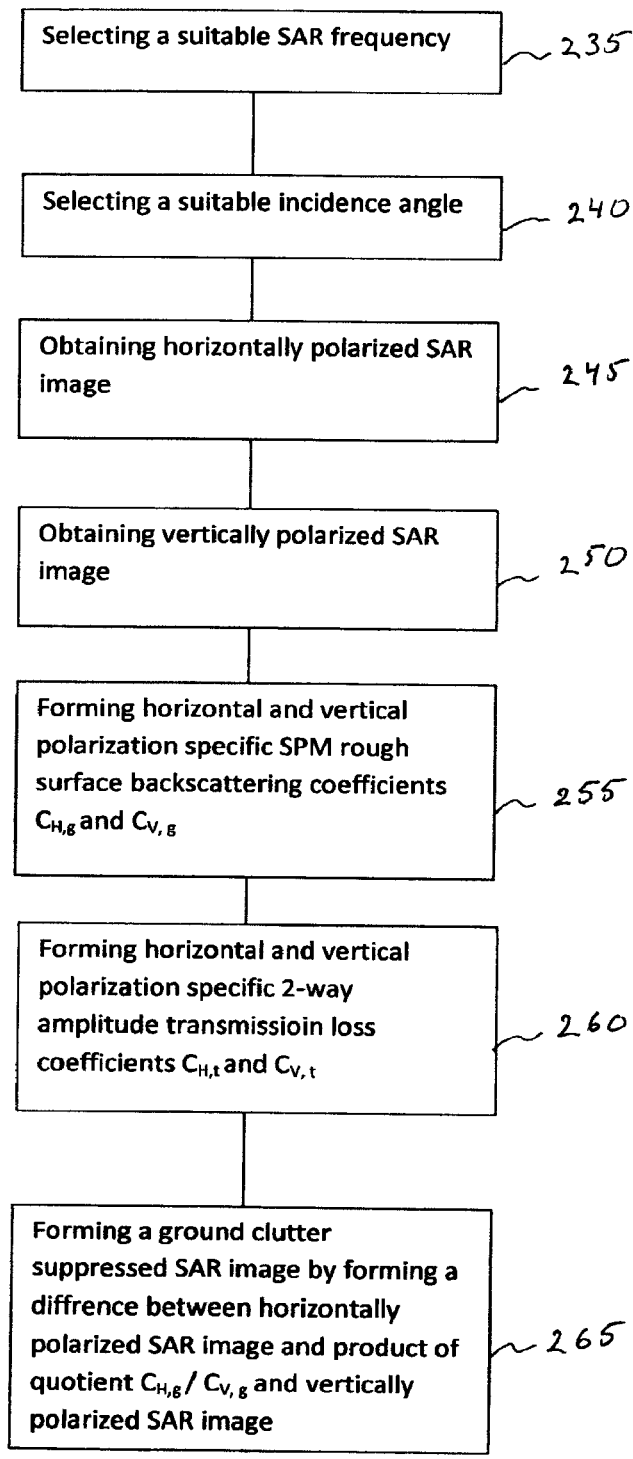
FIG. 2b is a flowchart of an analytical method of detecting subsurface targets using SAR

The present invention provides a method for creating a so called polarimetric change image. Such a polarimetric change image is obtained in two main steps. The steps efficiently remove the ground response but keeps the subsurface response. FIG. 2b shows a flowchart of such a method of detecting subsurface targets using SAR. It may be called the "analytical" method.

The main steps, in addition to obtaining horizontally and vertically polarized images, and forming 255, 260 coefficients as described above, are:

1. Multiplying 265 the second equation with quotient . . . $C_{Hg}/C_{Vg}$ . . .

$$F_H(x,y) = c_{H,g} f_g(x,y) + c_{H,t} f_t(x,y)$$

$$F_V(x,y) = c_{V,g} f_g(x,y) + c_{V,t} f_t(x,y)$$

2. Subtracting 265 the two equations from each other forming a polarimetric change image $\Delta F(x,y)$ also called a ground clutter suppressed SAR image.

$$\Delta F(x, y) = F_H(x, y) - \frac{c_{H,g}}{c_{V,g}} F_V(x, y) = c_{H,t} \left(1 - \frac{c_{H,g}}{c_{V,g}} \frac{c_{V,t}}{c_{H,t}}\right) f_t(x, y) \quad (III)$$

These steps result in a desired cancellation of ground response and also in a change in subsurface target response.

Interpretation of PCD with Respect to Radar Cross Section

Relations to radar cross section or reflectivities at different polarizations and for surface and target scattering elements, measured at any point in intensity SAR images will be explained in the following.

PCD Target Attenuation Understood

The independent ratio of H- and V-polarization responses from ground surface and target can be used to suppress the latter at the price of a certain attenuation affecting the target response.

Figures 4A, 4B:
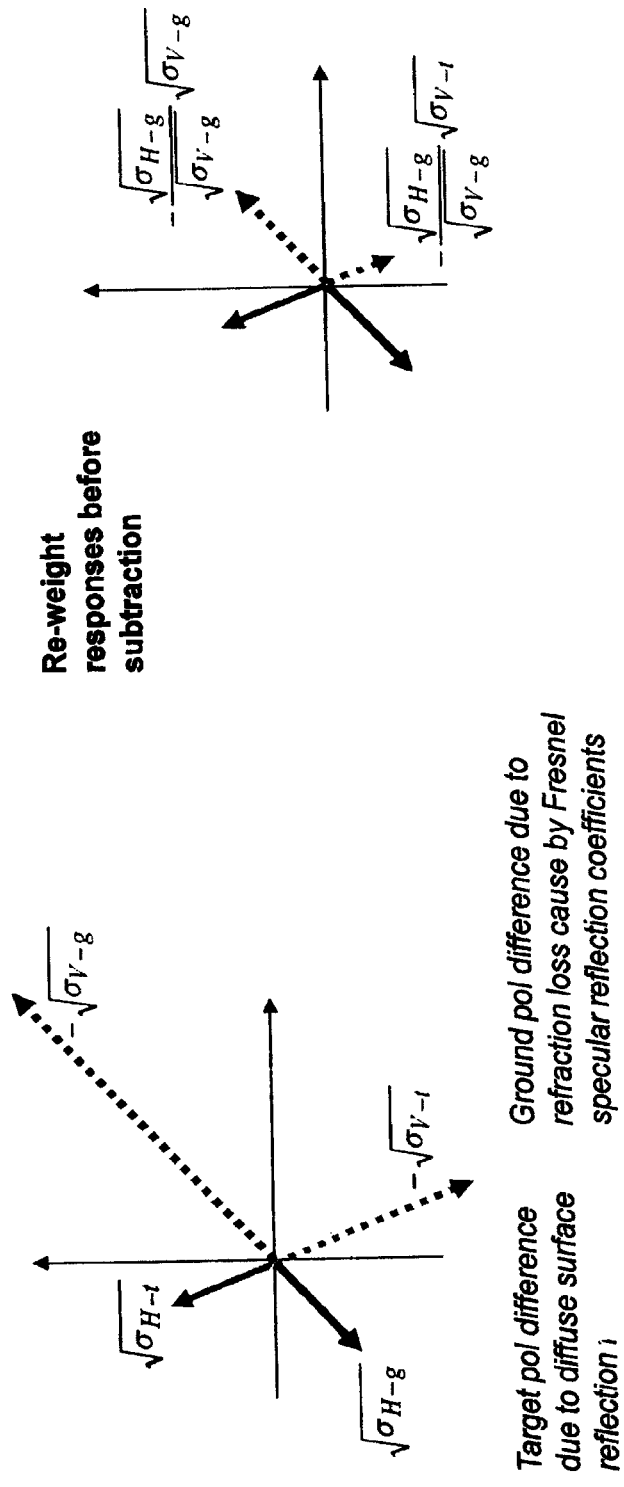
FIG. 4b shows the responses of FIG. 4a re-weighted by selecting weighting coefficients so as to cancel the ground surface response.

FIG. 4a shows an example of complex valued response from target and ground surface. Incidence is from above left, and dotted arrow in first quadrant and unbroken line arrow in third quadrant represents target polarization difference due to diffuse surface reflection. Unbroken line arrow in second quadrant and dotted line arrow in fourth quadrant represents ground polarization difference due to refraction loss caused by Fresnel specular reflection coefficients.

FIG. 4b shows the responses of FIG. 4a re-weighted by selecting weighting coefficients so as to cancel the ground surface response.

Figure 4C:
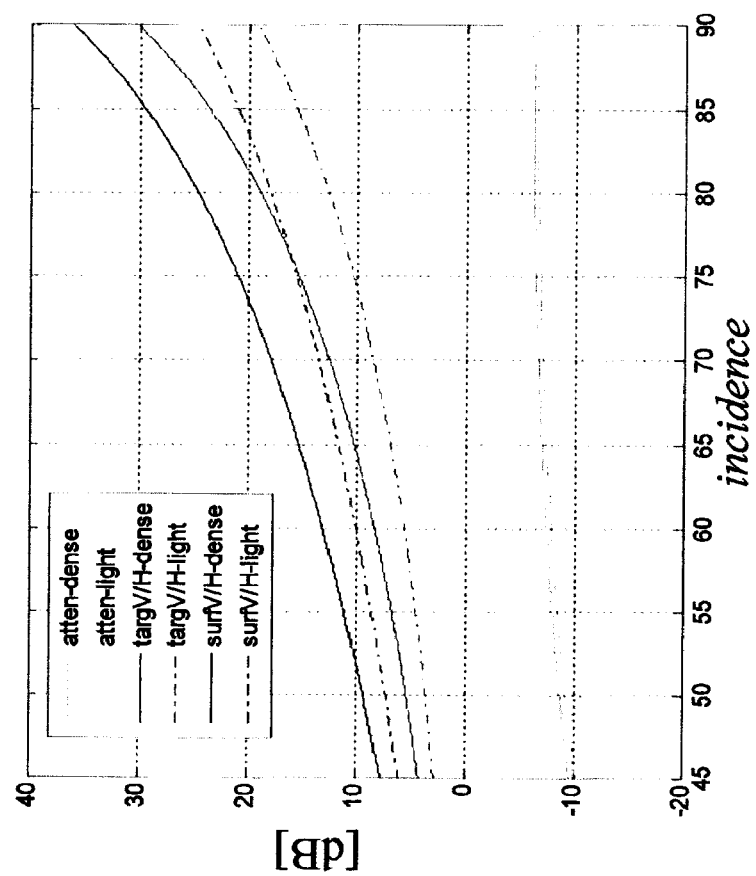
FIG. 4c shows a diagram of intensity [dB] of radar signal vs., incidence angle using SPM theory and Fresnel reflection coefficients to calculate target and surface response as a function of incidence angle and to see the net attenuation of the target response when the surface response is cancelled. It is observed that the attenuation is relatively independent of incidence angle.

FIG. 4c shows a diagram of intensity [dB] of radar signal vs. incidence angle using SPM theory and Fresnel reflection coefficients to calculate target and surface response as a function of incidence angle and to see the net attenuation of the target response when the surface response is cancelled. It is observed that the attenuation is relatively independent of incidence angle, as also can be seen from the equation below.

$$atten = \frac{1}{\sqrt{\sigma_{H-t}}}\left[\sqrt{\sigma_{H-g}} + \sqrt{\sigma_{H-t}} - \frac{\sqrt{\sigma_{H-g}}}{\sqrt{\sigma_{V-g}}}(\sqrt{\sigma_{V-g}} + \sqrt{\sigma_{V-t}})\right]$$

$$= 1 - \frac{\sqrt{\sigma_{H-g}}}{\sqrt{\sigma_{V-g}}}\frac{\sqrt{\sigma_{V-t}}}{\sqrt{\sigma_{H-t}}} = 1 - \sqrt{\frac{\sigma_{V-t}/\sigma_{V-g}}{\sigma_{H-t}/\sigma_{H-g}}} = 1 - \sqrt{\frac{\sigma_{V-t}/\sigma_{H-t}}{\sigma_{V-g}/\sigma_{H-g}}}$$

FIG. 5 shows relations to radar cross section or reflectivities at different polarizations and for surface and target scattering elements, measured at any point in intensity SAR images.

Adaptive PCD Algorithm

The present application discloses two basic methods for detecting subsurface targets
- one deterministic/analytic method, as described above, relying on the fact that ground index of refraction is known and
- one adaptive method, not requiring such knowledge but assuming index of refraction being the same over an area.

Whilst attenuation of the subsurface target response is almost independent of index of refraction, the surface V to H ratio depends significantly on the index of refraction, see FIG. 4a; this strongly favors the adaptive method.

Figure 3A:
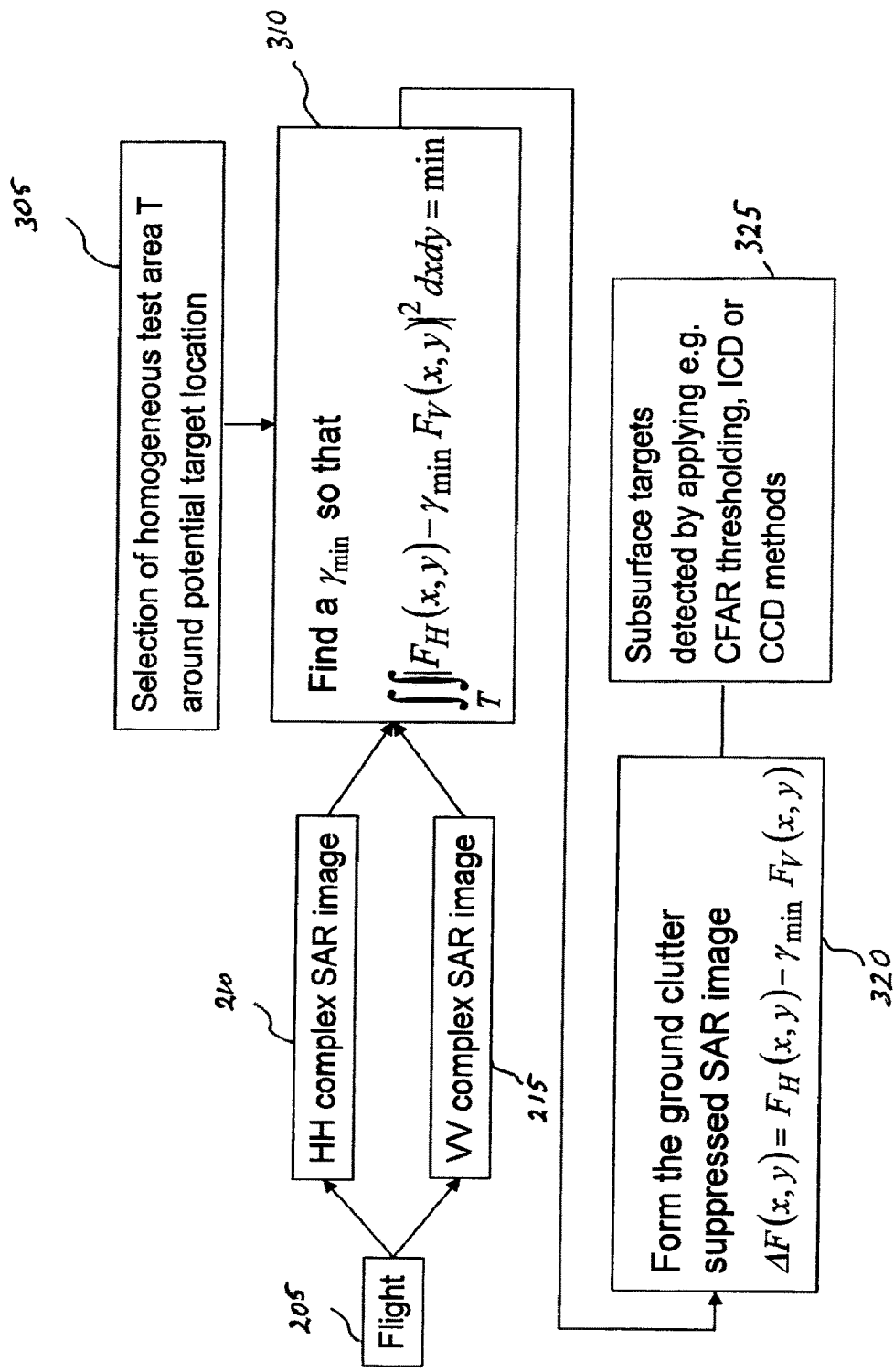
FIG. 3a is a flowchart of an adaptive method of detecting subsurface targets using SAR
Figure 3B:
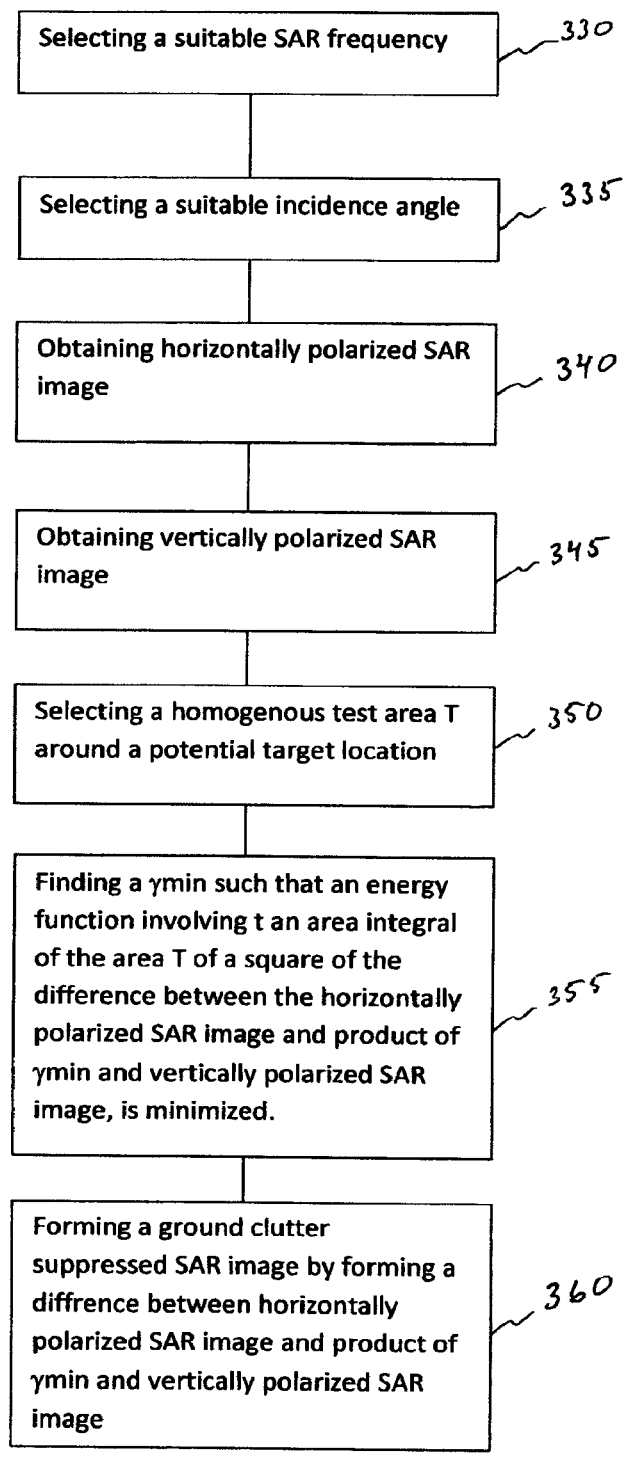
FIG. 3b is a more detailed flowchart of the adaptive method of FIG. 3a FIG. 4a shows an example of complex valued response from target and ground surface.

FIGS. 3a and 3b shows a flowchart of the adaptive method. The method relies on that subsurface targets are sporadic and that they will not energy-wise affect the SAR image. The method comprises the following steps:
- selecting 330, 335 suitable SAR frequency and incidence angle such that the ratio of surface backscattering to subsurface target backscattering is significantly larger for vertical polarization than for horizontal;
- with the aid of an aircraft in flight (205);
- obtaining 210, 340 a HH complex SAR image $F_H(x,y)$;
- obtaining 215, 345 a VV complex SAR image $F_V(x,y)$;
- Selecting 305, 350 a homogenous test area T around a potential target location;
- Finding 310, 355 a $\gamma_{min}$ such that an energy function$^E$ formed as the integral over the area$^T$ of the square of the difference between the horizontal polarization SAR image and the product of $\gamma_{min}$ and the vertical polarization SAR image, is minimized;

$$E = \int\int_T |F_H(x, y) - \gamma_{min}F_V(x, y)|^2 dxdy = \min$$

forming 320, 360 a ground clutter suppressed SAR image $\Delta F(x,y)$ by forming the difference between the horizontal polarization SAR image and the product of $\gamma_{min}$ and the vertical polarization SAR image;

$$\Delta F(x,y) = F_H(x,y) - \gamma_{min}F_V(x,y)$$

Subsequently subsurface targets may be detected 325 by applying e.g. CFAR thresholding, ICD or CCD methods on $\Delta F$.

System

Figure 6:
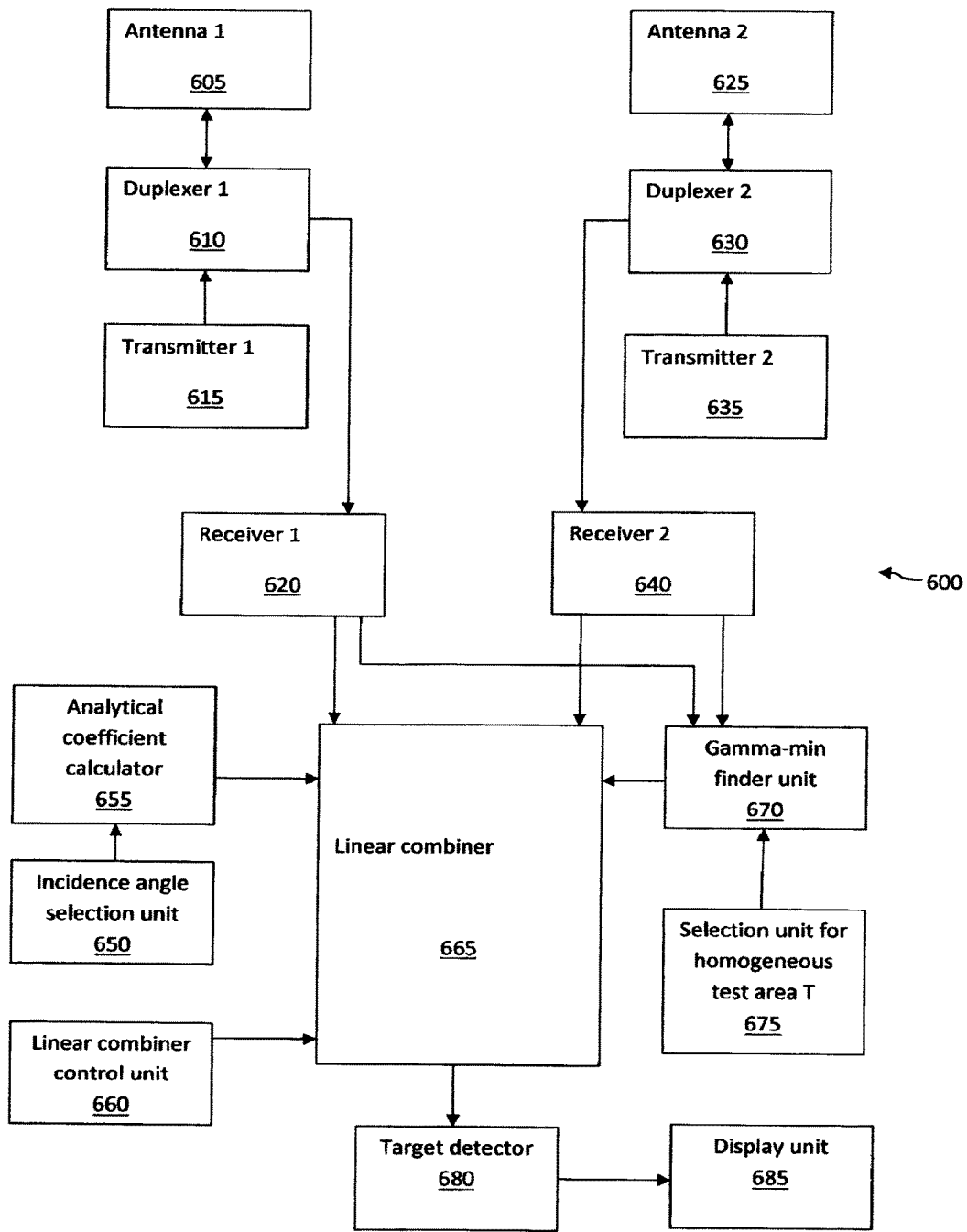
FIG. 6 shows, in a block diagram representation, a SAR system for obtaining SAR images having removed surface clutter to improve detection of subsurface targets.

FIG. 6 shows a block diagram of a system for detection of subsurface targets using one of or both methods as described above. In the following first transmitter, first antenna, first duplexer and first receiver are for horizontal polarization signals, while second transmitter, second antenna, second duplexer and second receiver are for vertical polarization signals.

The system comprises first chain for obtaining a horizontally polarized radar image, i.e., a first transmitter 615, a first antenna 605, a first duplexer 610 and a first receiver 620. Further it comprises a second chain for obtaining a vertically polarized radar image, i.e., a second transmitter 635, second antenna 625, second duplexer 630 and second receiver 640.

The system further comprises an incidence angle selection unit 650 for providing incidence angle to a analytical coefficient calculator 655, which calculates coefficients $$C_{H,g}, C_{V,g}, C_{H,t}, C_{V,t}$$

as explained above.

Further the system comprises a linear combiner control unit 660 for controlling a linear combiner 665 to linearly combine the images from the first receiver 620 and the second receiver 640 to form a ground clutter suppressed SAR image $\Delta F(x,y)$ by forming the difference between the horizontal polarization SAR image and the product of $\gamma_{min}$ or $C_{H,t}/C_{V,t}$ and the vertical polarization SAR image, as selected by an operator and conveyed by the linear combiner control unit 660.

The system also comprises a gamma-min $\gamma_{min}$ finder unit 670, for finding and providing to the linear combiner, a $\gamma_{min}$ according to what has been explained for minimizing the energy function E according to the adaptive method as explained above. The system also has a selection unit 675 for selecting a homogenous test area T as input to gamma-min finding unit 670.

The system may further be provided with a target detector 680 and a display unit 685 for detecting and visualizing detected targets to an operator.

The invention claimed is:

1. A method of removing surface clutter in SAR radar imaging of subsurface targets, said method comprising the steps of:
   selecting a first frequency and an incidence angle ($\chi 0$) for a radar signal such that the ratio of surface backscattering to subsurface target backscattering is significantly larger for vertical polarization than for horizontal polarization;
   simultaneously obtaining vertically and horizontally polarized SAR images, the obtained SAR images being coincident except for differences in the polarization of each, the obtained SAR images exploiting the selected first frequency and incidence angle for a vertically polarized and a horizontally polarized radar signal; and
   weighting and differencing, via a control unit, the vertically and horizontally polarized SAR images so that the surface backscattering completely cancels between the two images and only the combination of the target backscattering components remains.

2. The method according to claim 1, wherein the first frequency of the radar signal and the incidence angle are chosen such that the wavelength of the vertically polarized radar signal is at least one of greater than or equal to the surface roughness.

3. The method according to claim 1, wherein the incidence angle prevents shadows arising in the radar signal.

4. The method according to claim 1, wherein the incidence angle is chosen to be larger than zero and less than the Brewster angle, wherein an incidence angle of zero is horizontal incidence.

5. The method according to claim 1, wherein the horizontal and vertically polarized radar signals are generated by a horizontal and a vertical antenna that conduct registrations in a so called ping-pong mode.

6. The method according to claim 1, wherein the first frequency is between 25 and 500 MHz.

7. The method according to claim 6, wherein the first frequency is between 130 and 360 MHz.

8. The method according to claim 1, wherein transmitting and receiving components are provided and configured to work within a range of 25 m to 5000 m.

9. The method according to claim 1, wherein transmitting and receiving components are provided and configured to work within a range of 100 m to 500 m.

10. The method according to claim 1, wherein an adaptive minimum energy method is used to weight and difference the vertically and horizontally polarized SAR images so that the surface backscattering cancels between the two images and only the combination of the target backscattering components remains.

11. The method according to claim 10, wherein the method comprises the following steps:
    with the aid of an aircraft in flight (205):
      obtaining (210) a HH complex SAR image $F_H(x, y)$;
      obtaining (215) a VV complex SAR image $F_V(x, y)$;
      selecting (305, 350), within the images, an area T that appears to be homogenous;
      calculating (310) a $\gamma_{min}$ such that an energy function (E) is minimized, wherein:

$$E = \int\int_T -|F_H(x, y) - \gamma_{min} F_V(x, y)|^2 dxdy;$$

and
   forming (320) a ground clutter suppressed SAR image $\Delta F(x, y)$ by forming the expression:
   $\Delta F(x,y) = F_H(x,y) - \gamma_{min} F_V(x,y)$.

12. The method according to claim 11, wherein subsurface targets subsequently are detected (325) by applying one of CFAR thresholding, ICD or CCD methods on $\Delta F$.

13. A SAR system for providing SAR images having removed surface clutter to improve detection of subsurface targets, said system comprising:
    a selection unit configured for selecting a first frequency and an incidence angle ($\chi 0$) for a radar signal such that the ratio of surface backscattering to subsurface target backscattering is significantly larger for vertical polarization than for horizontal polarization;
    a linear combiner configured, via a linear combiner control unit, for:
      simultaneously obtaining vertically and horizontally polarized SAR images, the obtained SAR images being coincident except for differences in the polarization of each, the obtained SAR images exploiting the selected first frequency and incidence angle for a vertically polarized and a horizontally polarized radar signal; and
      weighting and differencing the vertically and horizontally polarized SAR images so that the surface backscattering completely cancels between the two images and only the combination of the target backscattering components remains.

14. The system according to claim 13, wherein the selection unit is further configured for selecting a homogenous test area T as input to a gamma-min finding unit.

15. The system according to claim 13, further comprising a target detector and a display unit for detecting and visualizing detected targets to an operator.

16. The system according to claim 13, further comprising a ping-pong control unit connected to the transmitters to make the transmitters send in ping-pong mode.

* * * * *